INVENTORS.
HANS W. HENDEL
FRANCIS F. CHEN
TSU-KAI CHU
HAROLD P. FURTH
FRANCIS W. PERKINS
THOMAS C. SIMONEN
JOHN B. TAYLOR

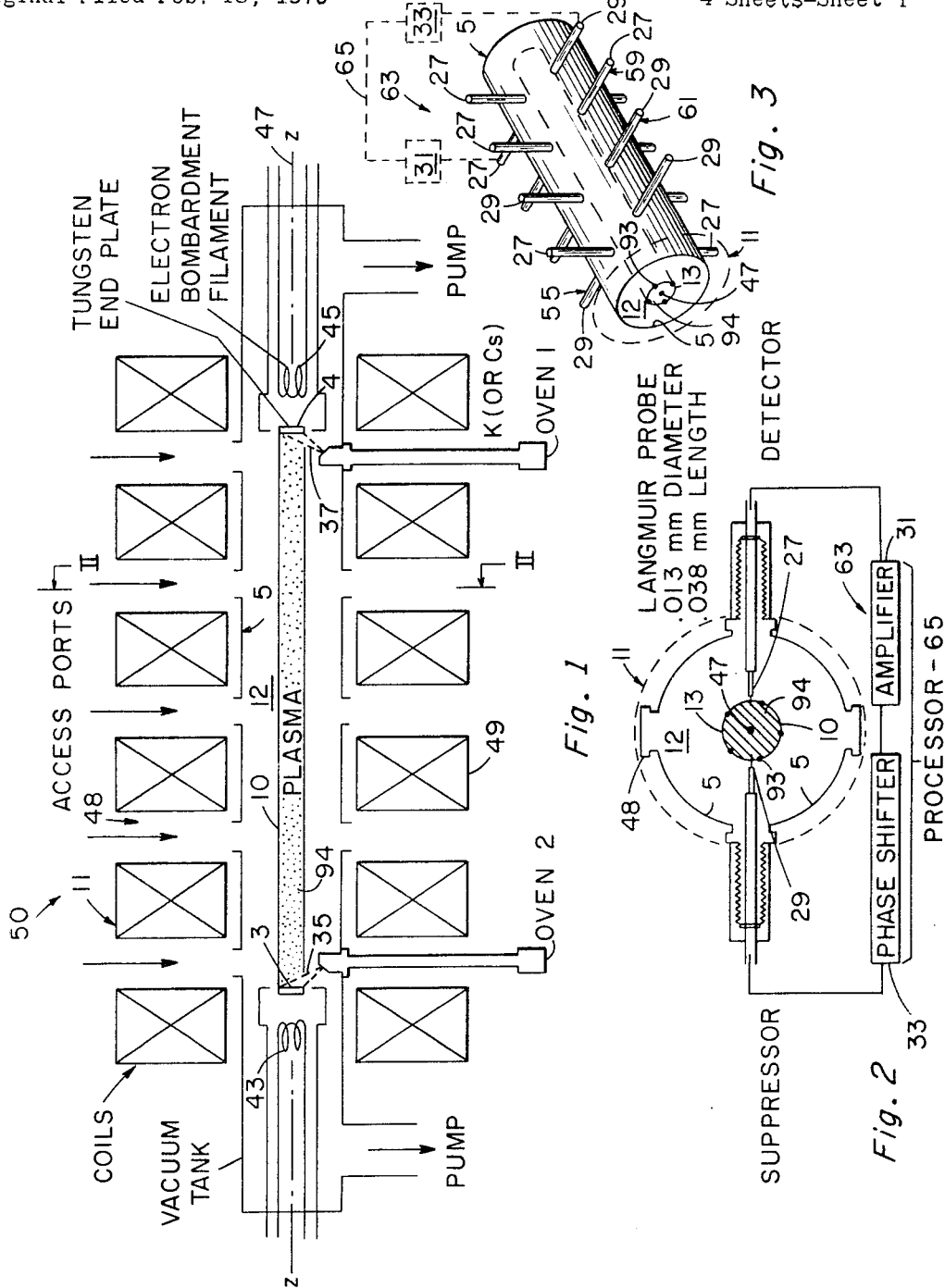

INVENTORS.
HANS W. HENDEL
FRANCIS F. CHEN
TSU-KAI CHU
HAROLD P. FURTH
FRANCIS W. PERKINS
THOMAS C. SIMONEN
JOHN B. TAYLOR

INVENTORS.
HANS W. HENDEL
FRANCIS F. CHEN
TSU-KAI CHU
HAROLD P. FURTH
FRANCIS W. PERKINS
THOMAS C. SIMONEN
JOHN B. TAYLOR

United States Patent Office 3,733,248
Patented May 15, 1973

3,733,248
PLASMA CONTROL BY FEEDBACK
Hans W. Hendel, Princeton, N.J., Francis F. Chen, Los Angeles, Calif., and Tsu-Kai Chu, Harold P. Furth, Francis W. Perkins, Thomas C. Simonen, and John B. Taylor, Princeton, N.J., assignors to the United States of America as represented by the United States Atomic Energy Commission
Continuation of abandoned application Ser. No. 12,309, Feb. 18, 1970. This application Feb. 15, 1972, Ser. No. 226,556
Int. Cl. G21b 1/00
U.S. Cl. 176—3                                              9 Claims

ABSTRACT OF THE DISCLOSURE

Method and apparatus for controlling instabilities in a magnetically confined plasma by applying feedback to the particle density, momentum, energy, and/or potential of the plasma, for maximizing the density of the same and/or for providing means for confining the plasma for long periods of time and/or at high temperatures. More particularly, this invention contemplates feedback control of the plasma by selectively injecting particles, momentum or energy into the plasma. In another aspect, this invention contemplates feedback control of the magnetic confining field.

---

This is a continuation of application Ser. No. 12,309, filed February 18, 1970, and now abandoned.

BACKGROUND OF THE INVENTION

In the field of plasma physics, it is desirable to confine plasmas magnetically. Various proposals have been made and used for such plasma confinement, comprising the arrangements described and shown in Princeton Plasma Physics Reports MATT-Q-25 and 26, "Project Sherwood—The U.S. Program in Controlled Fusion" by A. Bishop, Addison-Wesley Publishing Co. 1958, and U.S. Pats. 3,002,912 and 3,278,384. These arrangements, however, have employed static magnetic systems that have produced plasma instabilities, which have been difficult or impossible to control. Such control, for example, has involved complicated or expensive magnetic field configurations and/or relatively large power consumptions. Additionally, the art of plasma physics requires a simple and effective control system for plasma instability stabilization that does not trigger or lead to further instabilities and/or plasma losses.

SUMMARY OF THE INVENTION

This invention, which was made in the course of, or under a contract with the United States Atomic Energy Commission, provides a method and apparatus for feedback control of plasma instabilities produced in conventional magnetically confined plasmas. The method and construction involved in this invention utilize standard and well-known techniques and apparatus, and are highly flexible for application to a wide range of plasma energies, temperatures, and densities, and to a wide range of plasma constituents in linear and toroidal reactor geometries. More particularly, this invention involves the use of conventional systems for confining a plasma in a magnetic field for relatively long periods of time and provides simple and effective means for feedback control of the instabilities in the plasma. The feedback control provides means for injecting particles, momentum, or energy into the plasma at the proper amplitude, phase, and frequency for controlling the plasma instabilities in magnetically confined plasmas to increase the plasma density, temperature, and/or confinement time. With the proper selections of feedback, as described in more detail hereinafter, this invention provides a simple, effective, and practical system for achieving the desired suppression of the plasma instabilities.

The above and further novel features and objects of this invention will appear more fully from the following detailed description of several embodiments of this invention when read in connection with the accompanying drawings, and the appended claims will point out the novel features of this invention.

BRIEF DESCRIPTION OF THE DRAWINGS

FIG. 1 is a partial three-dimensional view of a conventional Q machine at Princeton University for providing a magnetically confined plasma column;

FIG. 2 is a partial cross section of one embodiment of the feedback control system of this invention for injecting particles, momentum, or energy into the magnetically confined plasma column of FIG. 1;

FIG. 3 is a partial three-dimensional view of the Q machine of FIG. 2, showing another embodiment of this invention for injecting particles, momentum, or energy into the plasma column thereof;

DESCRIPTION OF THE PREFERRED EMBODIMENT

Figure 5:
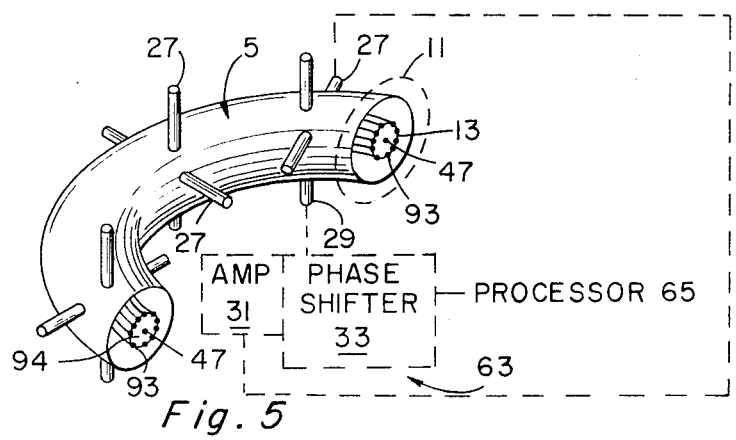
FIG. 5 is a partial three-dimensional view of a toroidal embodiment of this invention embodying the probe and suppressor of the feedback control apparatus of FIG. 2.

This invention is useful in controlling plasma instabilities in the Q machine at Princeton University. However, as will be understood in more detail hereinafter, this invention is useful in a wide variety of plasmas confined in magnetic fields over a wide range of plasma densities, temperatures, velocities, and constituents. For example, the plasma constituents may comprise electrons and ions of the same or different species. In the Q machine the plasma densities are low, but as will be understood in more detail hereinafter, this invention can be employed with higher densities, and at temperatures as used in gas lasers, or in thermonuclear reactors. One suitable species of ions in the Q machine, comprises cesium ions, but other heavier or lighter ions, may also be used alone or in combination. Accordingly, this invention is useful for a wide variety of applications over a wide range of plasma particle velocities, densities, temperatures, constituents, magnetic field strengths and configurations, and confinement times.

As described on pages 16 and 17 of "Project Sherwood—The U.S. Program in Controlled Fusion" by Amasa Bishop, Addison-Wesley, 1958, if a magnetic field is applied to plasma particles in a vacuum tube, the paths of the particles will be bent in tight helixes encircling the lines of force of the magnetic field. As a result, the particles are not free to move across the magnetic field lines to the walls of the tube and each particle is "tied" to a line of force about which it revolves at a radius that depends inversely upon the magnetic field strength. While particle collisions cause the particles to diffuse across the magnetic field, the rate of diffusion is inversely proportional to the square of the magnetic field strength (i.e., it varies as 1/B, where B denotes the magnetic field strength). This relationship is significant, for it shows that if a hot plasma is confined by a magnetic field, the rate of the particle diffusion towards the tube wall may be greatly reduced by increasing the strength of the magnetic field. However, instabilities can produce enhanced losses, and the control of these instabilities is the main concern of this invention.

The invention hereinafter described, utilizes a magnetic field of the types described in the above-cited Bishop publication, to which feedback stabilization is applied to suppress plasma instabilities and to increase plasma confinement. In this regard, the wide variety of magnetic field configurations and plasma forming and heating means described in the above-mentioned reference and those used in gaseous laser plasmas may be utilized in conjunction with this invention, but for ease of explanation one preferred embodiment will be described first in connection with the Q-1 machine at Princeton University. Other embodiments will be described in connection with several of the well known plasma forming and heating means and magnetic field configurations.

Referring to FIG. 1, one type of apparatus for forming and confining a plasma in a uniform magnetic field is the Q-1 machine at Princeton University. This apparatus is described and shown in Princetone Plasma Physics Laboratory Reports MATT-Q-25 and 26. Formation and heating of the plasma in the Q-1 machine, which is discussed in detail in Rev. Sci. Instr., vol. 31, pp. 1326–1333, December 1960, is based on the use of atom beams from ovens 1 and 2 impinging on ionizing plates 3 and 4 at both ends of a cylindrical vacuum container 5 for receiving injected particles from the plates and confining them in a column 10 in a uniform axial magnetic field formed by a conventional solenoid 11, this axis of the column 10 coinciding with the solenoids axis and/or the $z$ axis of the chamber 12 formed in the container 5. It will be understood by one skilled in the art, that the plasma may be formed by any of the variety of well known plasma forming means used heretofore, comprising those providing ionization in situ or by injection of neutrals or excited species. Likewise, as understood in the art, the confined plasma may be heated by any of the variety of well-known plasma heating means used heretofore for plasma physics research, comprising ohmic heating, ion cyclotron resonance heating, RF heating, microwave heating, turbulence heating, laser heating, magnetic pumping, adiabatic heating, or by injection of (excited) neutrals, molecular ions, or charged particles.

In order to explain how the feedback-stabilization means of this invention controls the plasma instabilities in plasma column 10 of the Q-1 machine of FIG. 1, reference is made to the well-known collisional drift instability, hereinafter referred to as the Universal Instability, that arises in column 10 when a critical magnetic field strength is exceeded. This Universal Instability has been identified in detail by the co-inventors of this invention, as described in Phys. Rev. Letters 18, 439 et seq. (1967), by a comparison with linear theory of the parametric dependence of the wave frequency $\omega$ and wave vector $k$. This above-cited refrence describes how, as the axial magnetic confining field increases, successive azimuthal modes destabilize when the electron-fluid expansion rate along the field lines exceeds the diffusion rate of ions across the field due to ion-fluid viscosity. Concomitant with instability onset, wave induced plasma loss occurs from the magnetically confined plasma 10, whereby the density of the plasma decreases.

By detecting the frequency and phase of this Universal Instability and providing a suitable feedback control therefrom in accordance with this invention, as described in more detail hereinafter, this Universal Instability has been selectively controlled at will repeatedly in actual practice at various plasma temperatures, densities, and magnetic field strengths, thus actually to control the plasma density in column 10. To this end, as will be more apparent from the following, this Universal Instability can be compared to a pendulum, the oscillation amplitude, frequency and phase of which provide the control system of this invention with a feedback signal for suppressing the pendulum oscillation.

For optimum stabilization, in accordance with the embodiment of this invention shown in FIG. 2, the control system of this invention detects the amplitude, phase and freqeuncy of the Universal Instability and derives therefrom a feedback signal for modulating the electron-current flow along the axial magnetic field lines. In this embodiment of FIG. 2, the feedback current is approximately out of phase for stabilization, and in phase for destabilization with the wave, in agreement with the linear-theory interpretation given below. Upon stabilization in actual tests, the instability amplitude is reduced by a factor of 100, and concomitantly, the plasma density and confinement increase correspondingly. As will be understood in more detail hereinafter, the described embodiment relies on selectively affecting the particle density in the plasma interior, e.g., by the suitable injection of particles into the interior of the plasma from modulated sources, rather than at the radial plasma surface described in Proceedings Third Conference On Plasma Physics and Controlled Nuclear Fusion Research, Novosibirsk, Aug. 1–7, 1968, Paper CN-24/J-13; and ETF Letters 8, 69 (1968).

The stability theory of the localized collisional modes of the Universal Instability with modulated electron and/or ion sources in accordance with the embodiment of FIG. 2 of this invention, can be carried out by including source terms, $-S$ in the linearized continuity equations in a "slab" model:

$$\partial n_{e,i}/\partial t - \nabla_\perp \cdot n_{e,i} u_{0e,i} + \nabla_\perp \cdot (n_0 u_{e,i}) + \nabla_\parallel n_0 u_{e\parallel} = S_{e,i}. \quad (1)$$

The calculation is made particularly simple by representing the source terms as $S_{e,i} = \sigma_{e,i} n_{e,i}$, $\sigma = |\sigma|\exp i\theta$, and assuming $\sigma_{e,i}$ independent of spatial coordinates. Using standard notation, we obtain the dispersion relation:

$$b\omega^2 + \left[ b(\omega_e + i\sigma_e) + i\frac{1+2b}{t_\parallel} + \frac{i}{t_\perp} \right] \omega - \frac{1}{t_\parallel t_\perp}[2 + t_\parallel \sigma_e + t_\perp \sigma_i]$$
$$+ i\omega_e \left[ \frac{1}{t_\perp} - \frac{1}{t_\parallel} + \sigma_i - \sigma_e \right] = 0, \quad (2)$$

where $$\omega_e = \kappa_y v_d, \; v_d = -cKT/eB)(1/n_0)(dn_0/dx) b = k_\perp^2 KTM/e^2B^2$$
$$= \kappa_\perp^2 KTM/e^2B^2, \; 1/t_\parallel = \kappa_\parallel^2 KT/m_e \nu_{ei}, \; 1/t_\perp = 1/4 b^2 \nu_{ii}.$$

For an electron sink, the stability criteria in the limiting cases are:

a) $1/t_\perp > 1/t_\parallel + |\sigma_e| \cos\theta$; if $\omega_e \gg 1/t_\parallel$ (long-wavelength limit)

(3)

b) $2/t_\parallel t_\perp > \omega_e(2b\omega_e - |\sigma_e| \sin\theta)$; if $\omega_e \ll 1/t_\parallel$ (short-wavelength limit).

(4)

We note that the criteria (3) and (4) for $\sigma_e = 0$ reduce to the conventional stability criteria of the collisional drift wave. Also, the stability criteria (3) and (4), and the dispersion relation, Eq. 2, reveal several important points. First, by adjusting the feedback gain $\sigma_e$ of amplifier 31, and phase $\theta$ in phase shifter 33 which are shown in FIG. 1, the growth rate $\gamma$, is controlled, thus to control the Universal Instability for stabilization or destabilization. Moreover, the optimum feedback phase for stabilization equals 180° and 270° in the long- and short-wavelength limits, respectively. Second, the feedback application in accordance with this invention, varies the instability frequency.

In the operaton of the particle injection control system of the apparatus of FIG. 2, a simple feedback system is employed in accordance with this invention to modulate the local electron flow. To this end this apparatus employs one detector 27 and one suppressor 29, comprising conventional Langmuir probes immersed in the plasma column 10. One suitable probe is described and shown in MATT-691 and in FIG. 2 of U.S. Pat. 3,171,788 by Gorman et al. In accordance with this invention the detector signal from detector 27, which is the instability amplitude is amplified in amplifier 31, phase-shifted in phase shifter 33, and capacitively coupled in real time to the suppressor 29 to vary electron current. With appropriate DC bias, the suppressor 29 may also be used to draw ion current. Also, the detector 23 and suppressor 29 can be suitably withdrawn from the plasma or biased as described in the above-referenced Gorman et al. patent.

In actual experiments on the above-described Princeton Q-1 device, the magnetically confined, fully ionized plasma in column 10 was produced by surface ionization of potassium atom beams 35 and 37 incident on 3.2 cm.-diameter, incandescent, electron emitting, tungsten plates 3 and 4 located at both ends of a 128-cm.-long plasma column 10, wherein the ion and electron temperatures substantially equaled the temperature (e.g., 2700° K.) of the ionizer plates which were heated by filaments 43 and 44. The detector 27 was a 0.25-mm.-diameter by 0.61-mm.-long Langmuir probe, such as described in the above-cited publications, and the suppressor 29 was similar in dimensions, or a 0.25.-mm-diameter by 3-cm.-long wire orientated along the magnetic field. The detector signal was passed through a conventional broadband audio amplifier 31 and a conventional continuously variable phase shifter 33. The suppressor 29 was generally located in the region of the maximum amplitude of the Universal Stability; i.e., axially in the midplane between the ionizer plates 3 and 4, and radially at $r \approx 7.5$ mm.$\approx \frac{1}{2}$ $r_{plasma}$, the detector 27 and suppressor 29 being directed normally transverse to the z-axis 47 of container 5 through suitable ports 48 between the coils 49 of the axial solenoid 11 of the Q machine 50 shown in FIG. 1.

Simultaneous measurements were made of the instability amplitude, equilibrium center density change, and frequency for constant feedback gain as a function of the phase delay $\theta$ of the applied suppressor voltage for different magnetic fields, i.e., different growth rates, with $\theta$ referenced to the spontaneous ion density oscillation at the location of the suppressor. Stabilization occurred with negative feedback, $\theta \approx 180°$, and destabilization with positive feedback, $\theta \approx 0°$. Coinciding with stabilization, the plasma density increased while positive feedback enhanced plasma losses. Also, the frequency decreased toward stabilization. Stabilization has been achieved over a range of feedback phase shift centered near 180°, and this range widened with increasing feedback gain and with decreasing instability growth rate. Also, the growth rate $\gamma$ and frequency $f$ calculated from Eq. 2 and the observed optimum phase shift, frequency reduction, and feedback-phase-shift range, as affected by growth rates, agreed qualitatively with the prediction from the theory given. Moreover, no other instabilities were produced by the described embodiment of this invention illustrated in FIG. 2.

These experiments also showed the measured radial distribution of equilibrium density $n_0$, the instability amplitude $n$, and the required minimum suppressor current I. In this regard, suppression was achieved with lowest feedback current at the radial location of the largest Universal Instability amplitude. Also, measurements were made of the plasma density in the center of column 10 as a function of the axial magnetic field strength for constant input flux. Starting with low magnetic field, confinement increased with increasing magnetic confining field B. When the collisional drift wave destabilized at $B=B_c$ the plasma density decreased abruptly. However, with feedback stabilization the plasma density increased continuosly beyond $B_c$ indicating that instability induced plasma losses were prevented.

Referring now to FIG. 3, which is a partial schematic three-dimensional view of a plurality of sets of the detector 27 and suppressor 29 of FIG. 2, the detector 27 and the suppressor 29 are arranged in quadrature in annular arrayed sets transverse to the axis of container 5, in the same plane. This arrangement has multiple detectors 27 and suppressors 29. Such multiple element feedback schemes have also been successfully demonstrated on the Princeton Q machine. Since the Universal Instability has a relatively long wave-length longitudinally along the axis 47 of container 5, the detectors 27 and suppressors 29 may be arranged in a plurality of probe sets for detecting and suppressing the Universal Instability anywhere in the plasma column 10. To this end, for example, probe set 59 is an annular array of detectors 27 and probe set 61 is an annular array of suppressors 29 arranged in spaced apart planes transverse and normal to the axis 47 of container 5. Thus, the multiple probe set arrangements shown in FIG. 3, are illustrated therein in several different variations of the simple probe embodiment shown in FIG. 2, each detector 27, as understood from the above, having an amplifier 31 and phase shifter 33 for feeding an appropriately processed suppressor signal into the plasma column 10 through an appropriate suppressor 29.

Figure 4:
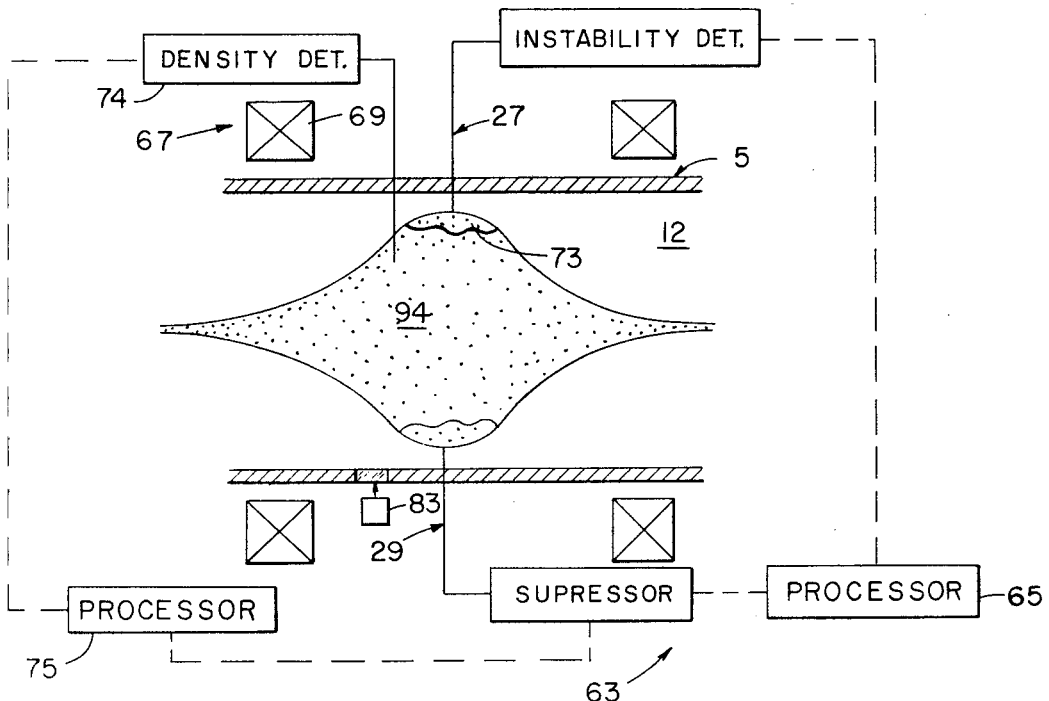
FIG. 4 is a partial cross section of a magnetic mirror incorporating the detector and suppressor of the feedback control apparatus of FIG. 2.

It will be understood in more detail from the following that various other combinations of detectors and suppressors may be arranged in like manner to provide an appropriately processed feedback signal. Likewise, while the feedback system of this invention has been described above with reference to plasma stabilization in the conventional Q-1 machine 50 having hot plate ionization means, any of the variety of other well known plasma forming magnetic field confining systems can be employed therewith. For example, the above-described feedback plasma instability suppressing system of this invention, illustrated in the drawings by reference number 63, can also be used with any of the other well known linear plasma confining machines. Thus, the above-described detector 27 and suppressor 29 and the described processor, which is illustrated in the drawings by reference number 65, comprising amplifier 31 and phase shifter 33, can be employed to suppress plasma instabilities in magnetic mirror systems, such as the magnetic mirror system 67 shown in FIG. 4. To this end the detector 27 detects the amplitude, frequency and phase of the plasma instability in plasma 94 and produces a first signal corresponding thereto. This first signal is amplified and appropriately phase shifted in processing system 65, and the processed signal is fed back into the plasma 94, which in the embodiment shown in FIG. 4 is confined between conventional magnetic mirror coils 69 around a vacuum container 5. In FIG. 4, for ease of explanation, a conventional solenoid like the above-described solenoid 11 around the container 5, is not shown. However, as is well known, the magnetic mirror system 67 can be combined with such a conventional solenoid. The described system thus suppresses plasma instabilities of any extent, which for purposes of illustration have been shown as of a limited extent identified by reference number 73.

Likewise while the embodiments shown in FIGS. 2-4 are adapted to suppress the Universal Instability in linear magnetically confined plasmas 10, the described particle momentum and/or energy injection system of this invention, and the feedback control system 63 therefore, can also be employed for suppressing the Universal Instability or other instabilities in toroidal magnetically confined plasmas 10. One such toroidal plasma is shown in FIG. 5.

Here, for purposes of illustraiton the device for forming and confining the plasma 10 is a stellarator, which has a solenoid and helical confining windings for confining a column 10, as is well known and as is described and shown in U.S. Pats. 3,002,912 by Spitzer, and 3,278,384 by Lenard et al. Another toroidal device in which the Universal Instability may be suppressed by particle, momentum, or energy injection by the feedback system 63 of this invention, is the Tokamak, which, as is well known, utilizes a solenoid 11 around a toroidal conducting vacuum container for producing a conventional uniform axial magnetic field, and an induced current along the axis thereof to produce a helical twist to the magnetic field lines. For instability feedback suppression, the detector 27 of FIG. 5 is connected to a processing system 65, having an amplifier 31 and phase shifter 33 as described above, for providing the described signal for the suppressor 29, so as to form a feedback control system, illustrated by reference number 63, such as is understood from the above.

While the above described embodiments of this invention involve Langmuir probes for detecting the Universal Instability, this invention also contemplates feedback stabilization employing various other detector and suppressor means. In one embodiment used on the Q–1 machine, a conventional detector produces a signal corresponding to the instability plasma density fluctuations in column 10. This signal is then fed to a modulator for modulating an RF power source for injecting a suitably modulated RF energy suppression signal of the correct amplitude, frequency and phase into the plasma. In the embodiment the density detector may be a light transmission plasma density detector having a light source, such as laser source and a light detector, wherein the light source directs a light beam through the plasma column 10 and the detector detects the light attenuation in passing the light beam through the column 10 for producing a signal corresponding to the density oscillations of the plasma in column 10. Another suitable detector, comprises a laser interferometer. However, this density detector may alternately comprise the neutral beam plasma density detector described in U.S. Pat. 3,300,640, and shown in FIG. 1 thereof or other well known density detectors.

In another embodiment, microwaves of an appropriate frequency, e.g., the upper hybrid frequency of the plasma in column 10, are irradiated onto the plasma column 10 from a conventional microwave source. In one experiment, the actual injected microwave frequency was 11 gigahertz at a power level of less than 0.1 watt. The microwave energy is a feedback modulated with suitable phase by the processing system. In this embodiment the detector may be a microwave or laser interferometer for modulating the microwave source at the proper phase and frequency for suppressing the instabilities in column 10. In addition, other well known instability detectors may alternately be used.

Figure 6:
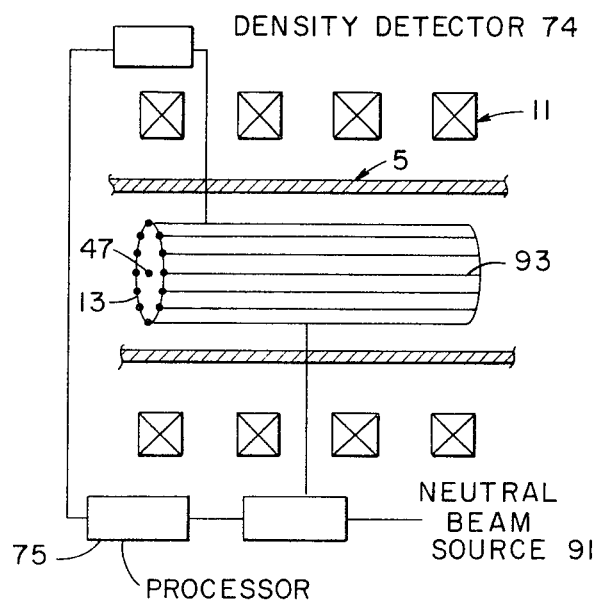
FIG. 6 is a partial schematic view of another embodiment for injecting momentum into the plasma column of FIG. 1, for neutral beam suppression of instabilities.

In still another embodiment of this invention shown in FIG. 6, low wrequency-stabilization of the plasma instabilities is achieved by feedback controlled neutral beams. In this embodiment the described plasma density detector and signal therefrom, such as from a detector 74, controls a suppressor, such as a neutral beam source 91, shown in FIG. 6, for the suitable injection of a beam of neutral particles under the influence of the feedback control described above. Further details of this embodiment are described in Princeton Plasma Physics Laboratory Report MATT–707, dated June 1969, by two of the co-inventors of this invention.

In the embodiment of FIG. 6, the suppression of the Universal Instability (i.e., or resistive drift wave) advantageously operates by density smoothing. For $$|v_x| \ll \omega^* \lambda$$

the marginal stability requirement for the case linearized and combined in the usual fashion to give a quadratic equation for $$\omega : \omega(\omega - \omega_1 - i\omega_f) + i\omega_s[\omega - \omega^* - i\omega_f + (kv_x/\omega_c)\omega_f] - (v_x/\lambda)\omega_f = 0, \text{ is } \omega_f = \omega_s(\omega - \omega^*)/\omega$$

and for $$\omega_s \gg |\omega^*| \gg \omega_f$$

becomes simply $\omega_f = \gamma$. Thus, a phase shift $\ominus$ of 180°, as in the above-described embodiments produces a smoothing of the density perturbation by the described feedback controlled neutral-beam injection.

In addition, this neutral beam feedback can also simulate minimum B as described in the above-cited Lenard et al. patent. Here for $v_x \gg \omega^* \lambda$, the pressure exerted by the momentum of the neutral beam becomes important. If the phase is chosen $\ominus = 0°$, then the beam pressure against the crest of the density perturbation is somewhat analogous to the effect of a favorable gradient of the zero-order magnetic field described in Phys. Fluids 8, 1004 (1965). The marginal stability condition is $$\omega_f = -\omega^*(\omega^* - \omega_1)\lambda/v_x$$

De-energization of the wave is also possible with injection of an neutral beam. In the limit $|v_x| \gg \omega^* \lambda$, we find an alternative stabilizing mechanism at a phase of $\ominus = 90°$, with the phase given by $\ominus = \arg(\omega_f/\omega^*)$. This mechanism works best for very small natural growth rates $\lambda$, corresponding to $\omega^2|k\lambda| \gg |\omega_c \omega^*|$, and then requires a gain $\omega_f = i\gamma \omega_c/kv_x$ for marginal stability. The momentum of the neutral beam exerts pressure against the region where the plasma is moving outward in $x$, and thus reduces the energy of the wave.

In a practical system for the embodiment of FIG. 6, the neutral beam breakup fraction for reaction parameters is conveniently of order unity. The frequency response of the beam is ample for any mode spectrum at or below the drift frequency. Spatial response is advantageously provided for all mode numbers aground the minor circumference in the case of a torus; but the beam injection is localized in a number of discrete stations around the major circumference. Favorable gradients of the magnetic field strength are introduced in the regions between the neutral beam stations. While this feedback control of local plasma production (neutral beam injection, or alternately controlled ionization of a thermal gas feed) is advanced relative to plasma stabilization by appropriate magnetic field configurations, feedback control of the described non-MHD plasma instabilities imposes relatively small burdens.

Figure 7:
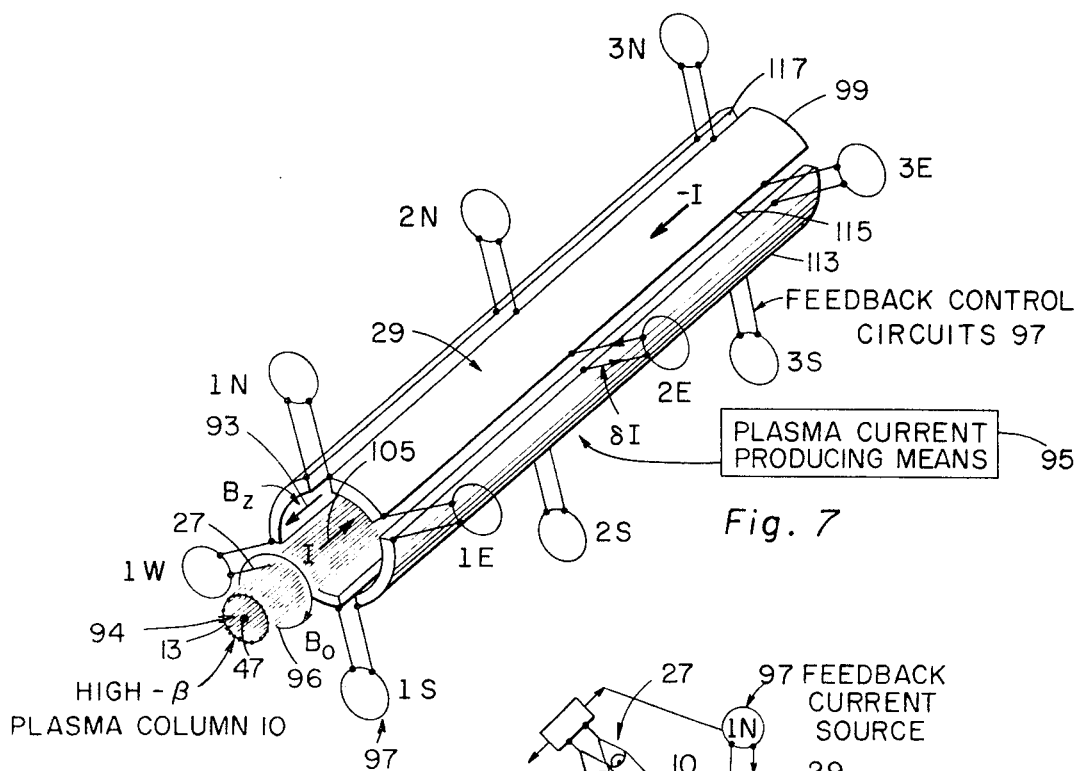
FIG. 7 is a partial three-dimensional view of another embodiment of the feedback control system of this invention, controlling plasma instabilities by magnetic feedback.

In addition to the above-described embodiments of this invention, injecting feedback energy, momentum or particles at the proper phase and frequency, this invention also provides another embodiment forming a magnetic feedback system. In this regard, the embodiment shown in FIG. 7 has a conventional uniform axial magnetic field producing means (not shown for ease of explanation) like solenoid 11, for producing axial field lines 93 for confining the conventional fully ionized plasma 94 in column 10 along the described axis 47, which may be linear as shown in FIG. 7 or toroidal as is well known and described above. The latter toroidal axis is produced, for example, in a Tokamak of the type described, although the described stellarator plasma or other plasmas may also be used.

The magnetic feedback system of FIG. 7, has means 95 for producing a plasma current in the plasma 94 along its axis 47 in the column 10 thereof. This current operates to ionize the plasma in column 10, which is contained in the conventional linear containers shown, or a toroidal vacuum container, such as the above-described Tokamak chamber, or a stellarator chamber, as described above.

The magnetic feedback system 97 of this invention has detectors 27 for detecting the instabilities in the plasma column 10, as described above, and conductors 99 responsive to these detectors 27 for providing a suitable magnetic feedback for controlling the instabilities.

In understanding the magnetic feedback system of the embodiment of FIG. 7, it is advantageous magnetically to confine high $\beta$ plasmas in a uniform magnetic field, wherein $\beta$ is the ratio of the inward magnetic pressure $P_B$ for confining the plasma along a longitudinally extending or endless (toroidal) axis, and the outward pressure $P_P$ of the confined plasma. Various proposals have been made and used for producing and confining high $\beta$ plasmas in a uniform magnetic field, based on the "self focusing" of rapidly moving plasma particles proposed by W. Bennett in 1934 and Tonks in 1937 and 1939, as reported in the above-mentioned Bishop publication on page 22 thereof. The basic principle involved in this approach, hereinafter referred to as the pinch effect, results from the interaction between a current in a gas or the fully ionized plasma in column 10 of FIG. 7, and the magnetic field produced by this same current. Thus, as the current builds up, it produces its own magnetic field, the lines 96 of which encircle the current, and this magnetic field, in turn, interacts with the particles of the discharge, exerting on them an inwardly directed force $P_B$ that tends to constrict, or pinch the plasma filament. This is analogous to the charged particle beam current described on page 72 of "Cyclic Particle Accelerators" by Livingood, Van Nostrand Co., 1961, where it is stated that the electrostatic force of repulsion exceeds the attractive force unitl the velocity reaches that of light when the two forces exactly cancel. One example of a toroidal pinch arrangement for plasma confinement is shown in FIG. 3–1 of the above-cited Bishop publication, "Project Sherwood—The U.S. Program in Controlled Fusion." Actual pinch devices, comprise SCYLLA, described in this above-mentioned publication, and the well-known SCYLLA, at the Los Alamos Scientific Laboratory, New Mexico, U.S.A. However, these pinch devices known heretofore have produced magnetohydrodynamic instabilities, hereinafter referred to as MHD instabilities, which have limited the plasma temperature, density or confinement times. Also, difficult and costly problems of construction and operation, have heretofore been involved in these devices, due, for example, to the static stabilization means contemplated, and it has been desirable to provide improvements for overcoming these difficulties.

This magnetic feedback system of FIG. 7 provides a method and apparatus for detecting instabilities, either MHD or non-MHD instabilities and providing a feedback signal for magnetically controlling the instabilities. To this end, the magnetic feedback system of this invention advantageously stabilizes a high $\beta$ plasma 10. This is particularly significant since heretofore MHD-stable static magnetic field congurations for high $\beta$ plasma, such as in the well-known Tokamak, tended to impose unwelcome restrictions on the necessary proximity of the conducting wall thereof, as well as on the values of $\beta$. In another aspect, as understood from the following, this embodiment of FIG. 7 provides self-well stabilization of non-MHD instabilities in a nonsymmetric equilibrium magnetic field configuration that gives rise to a discrete instability spectrum and an "inflection point" of equilibria that is unstable in only one direction.

Referring now more particularly to the aparatus of FIG. 7, the magnetic feedback system 97 of this invention provides means for stabilizing instabilities in a conventional plasma column 10 having axial $B_z$ field lines 93 forming an axial magnetic aperture 13 along the z axis 47 of the vacuum chamber 5, and encircling magnetic field lines 96 around the plasma column 10 produced by the well known pinch current in the plasma column 10 along the axis 47 thereof. An external conducting wall 103 may also be used around the vacuum chamber 12. As is well known, a conventional solenoid 11 around the vacuum chamber 12 produces the axial magnetic field lines 93, and the interaction therewith of a conventional means 95 to produce an axial pinch current 105 along the axis 47 in plasma column 10 helically twists the encircling field lines 96 around column 10. To this end, for example, as shown in FIG. 10–2 of the mentioned Bishop reference and described therein an ohmic induced discharge current 105 in column 10 may be used. By using the outer return conductor 99 of the induced torodial current 105, and splitting it up in such a way as to permit helical feedback currents to be applied in response to feedback sensing by detectors 27 of the formation of helical plasma instabilities, the instabilities are suppressed.

Detectors 27, comprising optical interferometers, are preferred to conventional magnetic pickup loops, because the latter pick up the magnetic field of the feedback system itself, as well as the magnetic field of the plasma column 10. Additionally, a nonsymmetric equilibrium field configuration is preferred. In this regard, the helical currents of the described magnetic feedback system 97 provide transverse magnetic fields acting back on the current-carrying plasma column so as to restore the helical deformations. In such a case, even the dominant $m=1$ mode in a simple symmetrical torodial configuration can grow in a variety of phases around the plasma circumference. Moreover, if one wishes to allow for a variety of circumferential wavelengths ($kR$–1–20 is unstable) the technical problems quickly become large. One the other hand, the described nonsymmetric equilibrium configuration gives rise to a discrete instability spectrum. Thus, this invention contemplates the particularly significant advantage of providing equilibra of the "inflection point" type, which are unstable in only one direction. Moreover, it will be noted from the above that there is a basic distinction between the above-described stabilization and the stabilization proposed for SCYLLA, in LA–4196–MS. In the last above-mentioned case, MHD stability is treated as a property of the static magnetic field and stabilization contemplates the need for combatting the much weaker non-MHD instabilities that remain. By employing magnetic stabilization in accordance with the above described embodiment of this invention shown in FIGS. 7 and 8 herein, MHD instabilities are also stabilized by feedback, whereby the self-well also suppresses non-MHD instabilities.

Figure 8:
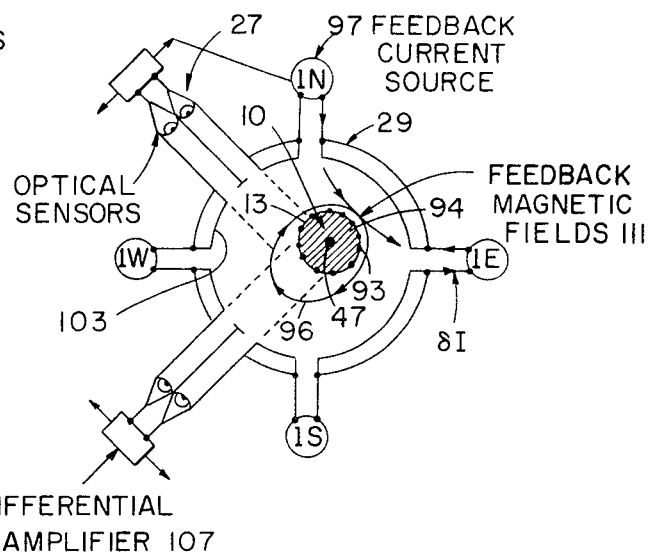
FIG. 8 is a partial cross section of the apparatus of FIG. 7.

In the operation of the magnetic feedback stabilization system of this invention illustrated in the embodiments shown in FIGS. 7 and 8 herein, the instabilities in the magnetically confined plasma column 10 are detected by detector 27, such as the detectors described above. To this end the detectors comprise conventional optical sensors and light source means, which produce signals corresponding to the amplitude, phase, and frequency of the instability. Additionally, the signal produced by a given detector 27 contains information on the location and spatial extent of the instability. Thus, the output signals from two detectors 27 are compared in a conventional differential amplifier 107 to produce a second signal corresponding in phase, frequency, location, and extent to the instability in column 10. This second signal thereupon actuates an appropriate feedback signal source, such as source 1N shown in FIGS. 7 and 8 to energize one of the described return conductors, such as conductor 99 to suppress the instability by producing a magnetic feedback field 111, such as shown in FIG. 8. Likewise, additional optical or other detectors 27, produce suitable signals for actuating feedback signal sources 1E, 1W, and 1S to produce like magnetic feedback fields 111 by suitably energizing conductors 113, 115, and 117 at locations (e.g., locations 2N, 3N, 2E, 3E, 2S, 3S, 2W, and 3N) where appropriate currents stabilize the instabilities in column 10. In this regard, the described feedback magnetic fields stabilize instabilities produced by the described plasma current I, illustrated by reference number 105. It is also understood, however, that the described magnetic feedback system 97 of this invention can act directly to stabilize instabilities in any plasma column immersed in a uniform magnetic field. Additionally, it will be understood from the above that the split return conductors 99, 113, 115, and 117 are advantageously arranged in combination to produce a transverse cusp shaped stabilizing feedback magnetic field. In this regard, this cusp field has a multipolar shape like the quadrupole shape shown in FIG. 7 and described in U.S. Pat. 3,141,826 by Friedrichs et al. and this field selectively varies in accordance with this invention described herein, in response to the feedback signals produced by the described detectors 27, thus to perform the described stabilization of instabilities in column 10. In this regard the variation in the strength of the magnetic feedback stabilization field of this invention can be compared to the variation of the confining field in a high energy charged particle accelerator, such as the BNL, AGS, wherein detectors in the form of pickup probes produces a feedback signal for producing a magnetic field strength corresponding to the beam parameters of the high energy beam in the accelerator.

It is understood from the above that this invention is not limited to the herein particularly mentioned and described linear and toroidal plasma research reactors, but may be applied to any of the reactors described and shown in the above-described publications and other plasmas for suppressing magnetohydromagnetic, non-magnetohydromagnetic, e.g., non-MHD Universal Instabilities or other instabilities.

Likewise, while several instability detectors and suppressors have been shown and described, it is understood from the above, that a wide variety of other detectors and suppressors may be used for feedback stabilization of the wide variety of short or long wavelength MHD, non-MHD, or other instabilities, in connection with linear and toroidal plasma devices, and the wide variety of plasma constituents, plasma temperatures, densities, confinement times, and magnetic field strengths and configurations known heretofore.

In review of the above, this invention provides a simple, practical and efficient method and apparatus for suppressing plasma instabilities in magnetically confined plasmas to which the heretofore known plasma forming means, heating means, and magnetic confining means have been applied. To this end, this invention utilizes feedback stabilization means. Suitable means are provided for detecting the amplitude, phase, and frequency of the instabilities and processing this detected signal by suitably amplifying and phase shifting the same. Also, suitable feedback means are provided for injecting energy or particles into the plasma for controlling the instabilities. In another aspect, magnetic feedback means are provided by this invention for suppressing instabilities comprising MHD instabilities in high $\beta$ plasmas. This invention has the advantage of providing feedback stabilization of magnetically confined plasmas for controlling and/or increasing the density and/or confinement time thereof. Also, this invention has the advantage of affecting the extent of the plasma instabilities over the whole volume of the plasma.

We claim:

1. In a Q machine for confining ionized particles along a first longitudinally extending axis in a magnetically confined plasma column that is subject to internal plasma instabilities, the latter causing plasma losses from said magnetically confined plasma column, the improvement, comprising
   (a) first means at a first predetermined spatial location for detecting said internal plasma instabilities for producing a first signal whose amplitude, phase and frequency correspond precisely with the amplitude, phase, and frequency of said internal plasma instabilities at said first predetermined spatial location;
   (b) second means responsive to said first means for receiving said first signal and for generating therefrom a feedback signal that can be processed by locating the same at a predetermined second spatial location in opposition to said internal plasma instabilities for suppressing said internal plasma instabilities; and
   (c) third means responsive to said second means for receiving said feedback signal and locating the same at said second predetermined spatial location as a processed input signal in opposition to said internal plasma instabilities for suppressing the same in accordance with said opposition by said processed input signal, thereby to reduce said losses from said magnetically confined plasma column.

2. The apparatus of claim 1, for suppressing internal plasma instabilities of the type consisting of collisional drift wave instabilities, in which:
   (a) said first means comprises a first longitudinally extending Langmuir probe transverse to said longitudinally extending axis, said first Langmuir probe being employed as a sensor for producing said first signal;
   (b) said second means, comprising a wide-band amplifier for receiving said amplified first signal to produce an amplified first signal, and a 180° phase-shifter responsive to said amplified first signal for producing said feedback signal;
   (c) said third means comprising a second longitudinally extending Langmuir probe transverse to said first longitudinally extending axis in a common plane with said first Langmuir probe but opposed thereto by 180° from the axis thereof for receiving said feedback signal and transmitting the same in the form of said processed input signal at said second predetermined spatial location in opposition to said internal plasma instabilities for suppressing said collisional drift wave instabilities, thereby to reduce said losses from said magnetically confined plasma column.

3. The apparatus of claim 1 in which:
   (a) said first means is located in said magnetically confined plasma column for detecting said internal plasma instabilities throughout the entire volume of said magnetically confined plasma column,
   (b) said third means being located in said magnetically confined plasma column for suppressing said internal plasma instabilities detected by said first means.

4. The apparatus of claim 1, in which said first, second and third means are arranged to form an automatic remotely operable system for continuously suppressing said internal plasma instabilities for maximizing the density of the plasma in said magnetically confined plasma column.

5. The apparatus of claim 1, having fourth means for determining the density of the plasma in said magnetically confined plasma column, and wherein said third means is responsive to said fourth means for selectively suppressing said internal plasma instabilities in accordance with the determining of said density by said fourth means for maximizing said density in said magnetically confined plasma column.

6. The apparatus of claim 1 in which said second and third means form a system for injecting energy into said magnetically confined plasma column for suppressing said internal plasma instabilities therein in accordance with the phase and frequency of said first signal and the spatial location of said first means at said first predetermined location relative to the internal plasma instabilities detected thereby.

7. The apparatus of claim 1, wherein said second and third means form a system having a source means for producing said processed input signal in the form of energy, momentum or particles for suppressing said internal plasma instabilities in accordance with the internal plasma instabilities detected by said first means, said source means being selected from the group consisting of current sources, microwave sources, charged particle sources, neutral particle sources, electromagnetic energy sources, and magnetic field producing means.

8. The apparatus of claim 1 in which said third means incorporates magnetic means responsive to said second means for magnetically opposing said internal plasma instabilities, said magnetically confined plasma column having a high $\beta$ plasma therein that is subject to said internal plasma instabilities that are detected by said first means.

9. The apparatus of claim 1 having means for producing a current in said plasma for producing a magnetic field that encircles said magnetically confined plasma column and magnetically interacts with said processed input signal in opposition to said internal plasma instabilities for suppressing the same to reduce said losses from said magnetically confined plasma column.

References Cited

UNITED STATES PATENTS

| | | | |
|---|---|---|---|
| 3,257,283 | 6/1966 | Hamberger | 176—3 |
| 3,580,802 | 5/1971 | Johnson et al. | 176—1 |

REUBEN EPSTEIN, Primary Examiner

U.S. Cl. X.R.

176—1